United States Patent [19]

Badders

[11] 4,230,145
[45] Oct. 28, 1980

[54] FLUID CONTROL VALVE

[76] Inventor: Edwin T. Badders, 3087 Riverside Dr., Pomona, Calif. 91766

[21] Appl. No.: 885,593

[22] Filed: Mar. 13, 1978

Related U.S. Application Data

[63] Continuation-in-part of Ser. No. 745,673, Nov. 29, 1976, abandoned, which is a continuation-in-part of Ser. No. 553,590, Feb. 27, 1975, Pat. No. 3,994,029.

[51] Int. Cl.³ .................... F16K 31/18; F16K 33/00
[52] U.S. Cl. .................................... 137/410; 137/445
[58] Field of Search .............. 137/410, 412, 413, 414, 137/445, 446; 251/25, 45, 46, 280, 319; 4/324, 405, 407, 366, 367

[56] References Cited

U.S. PATENT DOCUMENTS

| | | | |
|---|---|---|---|
| 509,401 | 11/1893 | Scott | 251/46 |
| 2,092,670 | 9/1937 | Hess et al. | 137/413 |
| 2,412,691 | 12/1946 | Owens | 137/414 X |
| 2,491,130 | 12/1949 | Owens | 137/410 |
| 2,492,436 | 12/1949 | Owens | 137/410 |
| 2,528,423 | 10/1950 | Chacc | 137/412 |
| 2,760,204 | 8/1956 | Joanis | 4/367 |
| 2,838,765 | 6/1958 | Hosking | 4/407 |
| 3,081,790 | 3/1963 | Radford | 137/413 |
| 3,145,729 | 8/1964 | Cordis | 137/414 |
| 3,147,771 | 9/1964 | Elbogen et al. | 137/413 |
| 3,196,899 | 7/1965 | Lattemann | 137/410 |
| 3,324,878 | 6/1967 | Dill | 137/445 |
| 3,429,333 | 2/1969 | Schoepe et al. | 137/414 |
| 4,077,602 | 3/1978 | Klessig | 251/25 |

*Primary Examiner*—Martin P. Schwadron
*Assistant Examiner*—G. L. Walton
*Attorney, Agent, or Firm*—Lyon & Lyon

[57] ABSTRACT

Disclosed herein is a pressure activated fluid control system particularly adapted for use as a flushing mechanism for toilets of the water tank type. This system includes a push button actuated control valve assembly which, in the shutoff position, urges a needle valve against a movable valve seat; a pressure actuated direction flow valve; and a tank ball lifting mechanism. The direction flow valve is in fluid communication with the control valve assembly which upon actuation of the control valve, allows incoming water under line pressure to pass to the lifting mechanism, raise a lift piston and lift the tank ball from the cistern drain. The tank ball depends from a piston disposed within a water filled lower cylinder and following the draining of the cistern, the tank ball slowly and precisely returns to the cistern drain as the water below the piston head within the lower cylinder passes from the cylinder through a check valve disposed about the piston rod. A float is connected to the needle valve to close the valve upon refilling of the cistern and prevent further fluid flow to the lifting mechanism.

9 Claims, 5 Drawing Figures

FLUID CONTROL VALVE

This application is a continuation-in-part of U.S. Pat. application Ser. No. 745,673, filed Nov. 29, 1976, entitled NOISE ATTENUATED FLUID CONTROL SYSTEM which is now abandoned and in turn is a continuation-in-part of Ser. No. 553,590, filed Feb. 27, 1975, entitled FLUID CONTROL SYSTEM, now U.S. Pat. No. 3,994,029, issued Nov. 30, 1976.

BACKGROUND OF THE INVENTION

The water tank type toilet or water closet commonly installed in homes or apartments is provided with a simple flushing mechanism which is generally comprised of a series of mechanical linkages which act to pull the tank ball from the tank or cistern drain by means of a connecting chain upon rotation of a pivotally mounted external handle. When the tank is flushed, the tank ball freely falls back over the cistern drain and the cistern is refilled. While this mechanism is quite simple, it has several shortcomings. The flushing operation is quite noisy, which is generally unpleasant. Difficulty is often encountered in rotating the flushing handle which often results in a loss of a portion of the water held in the cistern which results in a less efficient flushing of the toilet bowl. This occurs as a result of the tank ball being initially only partially lifted from the cistern drain and thereby allowing water to pass therethrough prior to the complete flushing of the bowl. When the ball is then completely lifted from the cistern drain and flushing occurs, less water is available to carry out the flushing operation. Furthermore, the standard flushing mechanism which allows the tank ball to freely drop back onto the cistern drain often causes an imperfect seal between the tank ball and cistern drain, resulting in a "running toilet" with water continually leaking through this imperfect seal.

In a toilet flush mechanism, it is highly desirable to release all of the water held within the cistern drain immediately upon actuation because the greater amount of water rushing to the cistern drain provides a more thorough flushing of the toilet bowl and therefore allows the toilet to be flushed with less water in the cistern. To accomplish a rapid flush of all the water held within the cistern, it is necessary to rapidly lift the tank ball from the cistern drain to prevent any premature leakage of the water supply which necessarily results when the tank ball is slowly withdrawn from the drain. In addition to rapidly lifting the tank ball, a toilet mechanism should slowly and precisely lower the tank ball onto the cistern drain after flushing to assure proper seating of the ball and provide a watertight seal and thereby prevent annoying leakage down the cistern drain. Additionally, the toilet flushing mechanism which accomplishes the rapid lift and slow and accurate return of the tank ball should be relatively quiet in its operation and compatible with the tank type toilets currently in use.

SUMMARY OF THE INVENTION

Briefly, the present invention relates to a control valve assembly adapted for use in a fluid control system, which in the preferred embodiment is utilized in a flushing mechanism in toilets of the water tank type. The control valve assembly is push button actuated which creates a pressure differential to control a direction flow valve mechanism. The direction flow valve mechanism, upon actuation, directs the incoming water under line pressure to a lifting mechanism which is secured to the tank ball seated in the cistern drain. The lifting mechanism, under the force of the incoming water, then rapidly raises the tank ball from the cistern drain, resulting in the flushing thereof. After the tank is drained, the lifting mechanism allows the tank ball to slowly and precisely return to the cistern drain, creating a watertight seal therewith and the tank is refilled.

It is the principal object of the present invention to provide a control valve assembly for use in a precise pressure activated fluid control system.

It is another object of the present invention to provide a fluid control valve having a positive closing action to prevent leakage therethrough.

It is another object of the present invention to provide a fluid control valve assembly for use in a flushing mechanism for toilets of the water tank type which provides rapid lifting of the tank ball from the cistern drain to reduce the amount of water necessary for flushing the toilet bowl.

It is a further object of the present invention to provide a control valve assembly for use in a flushing mechanism for toilets of the water tank type which is very quiet during operation.

It is yet another object of the present invention to provide a control valve assembly for a flushing mechanism for toilets of the water tank type which maintains the desired water level within the water tank.

These and other objects and advantages of the present invention will become apparent from the following detailed description taken in conjunction with the accompanying drawings.

IN THE DRAWINGS

Figure 1:
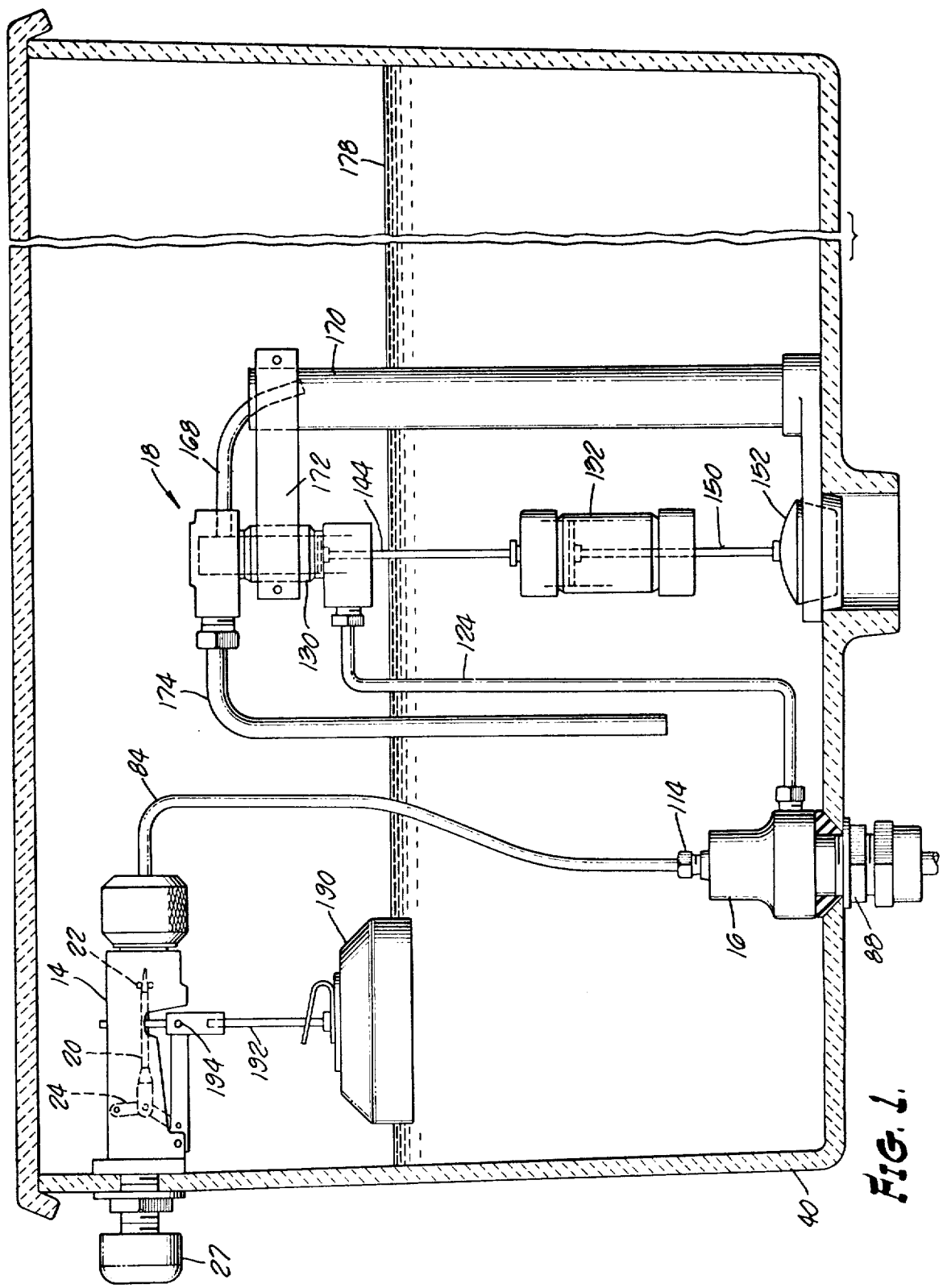
FIG. 1 is a sectional view of a tank type toilet embodying the flushing mechanism which constitutes the preferred embodiment of the present invention.
Figure 2:
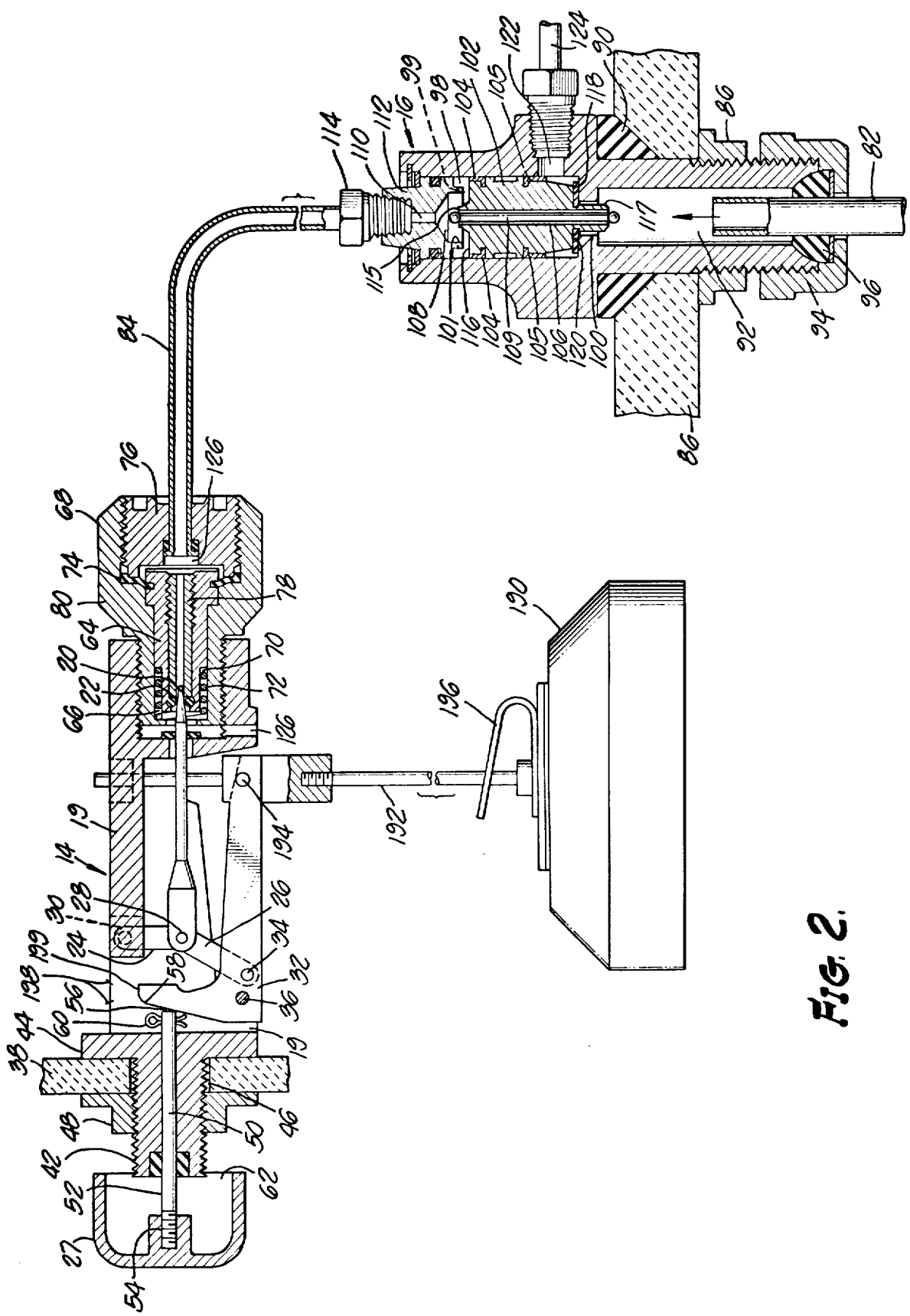
FIG. 2 is a sectional view of the push button actuated needle valve, control float and direction flow mechanism.
Figure 3:
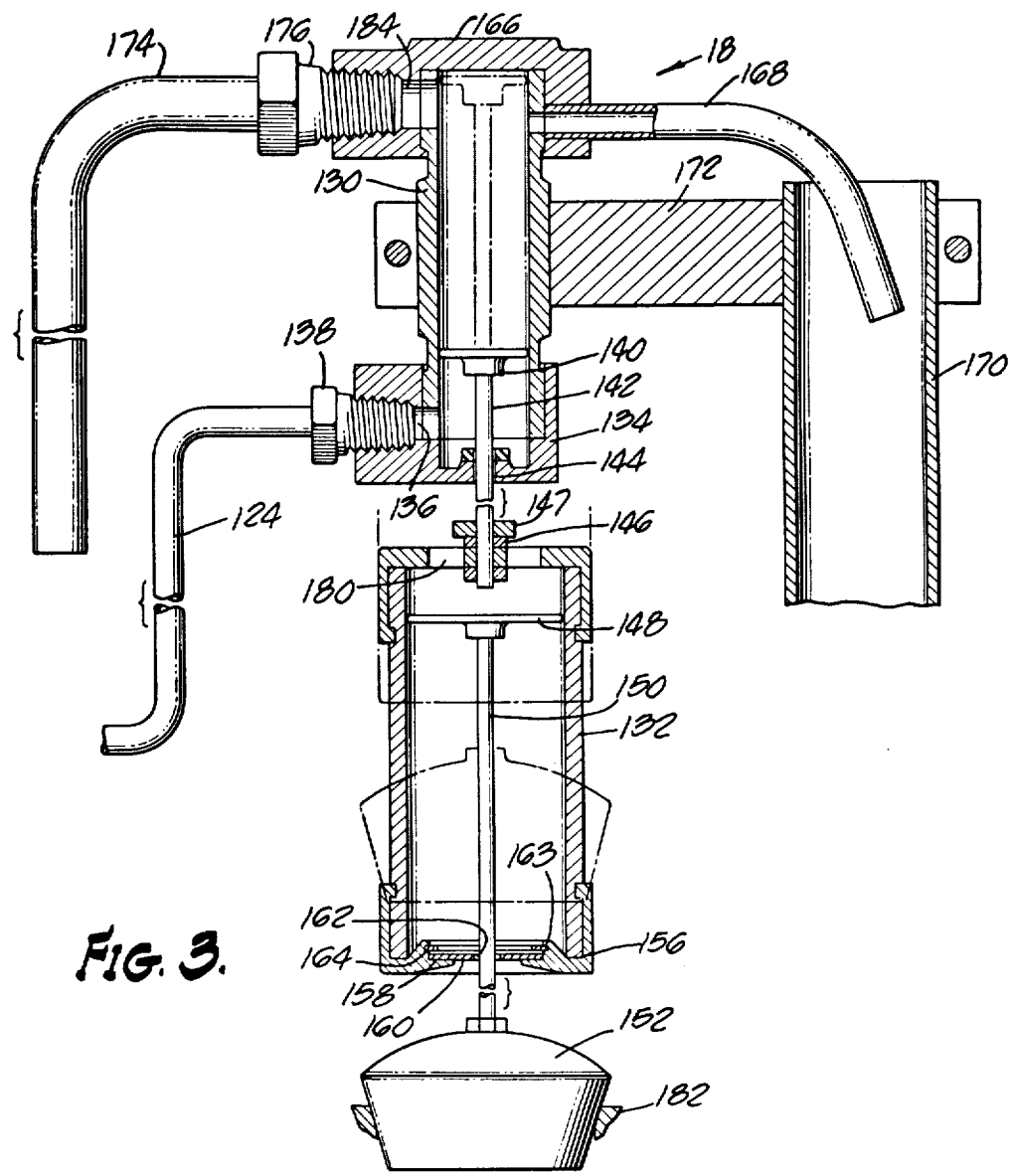
FIG. 3 is a sectional view of the lifting mechanism and tank ball.
Figure 4:
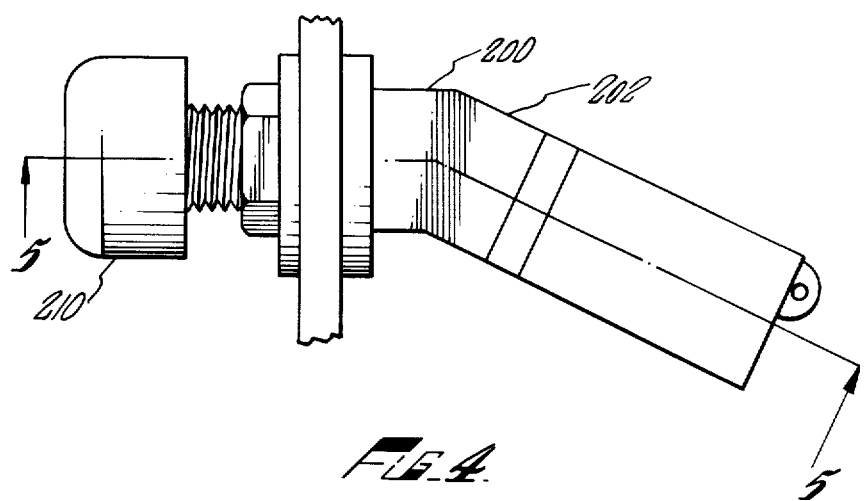
FIG. 4 is a plan view of a second embodiment of the present invention.
Figure 5:
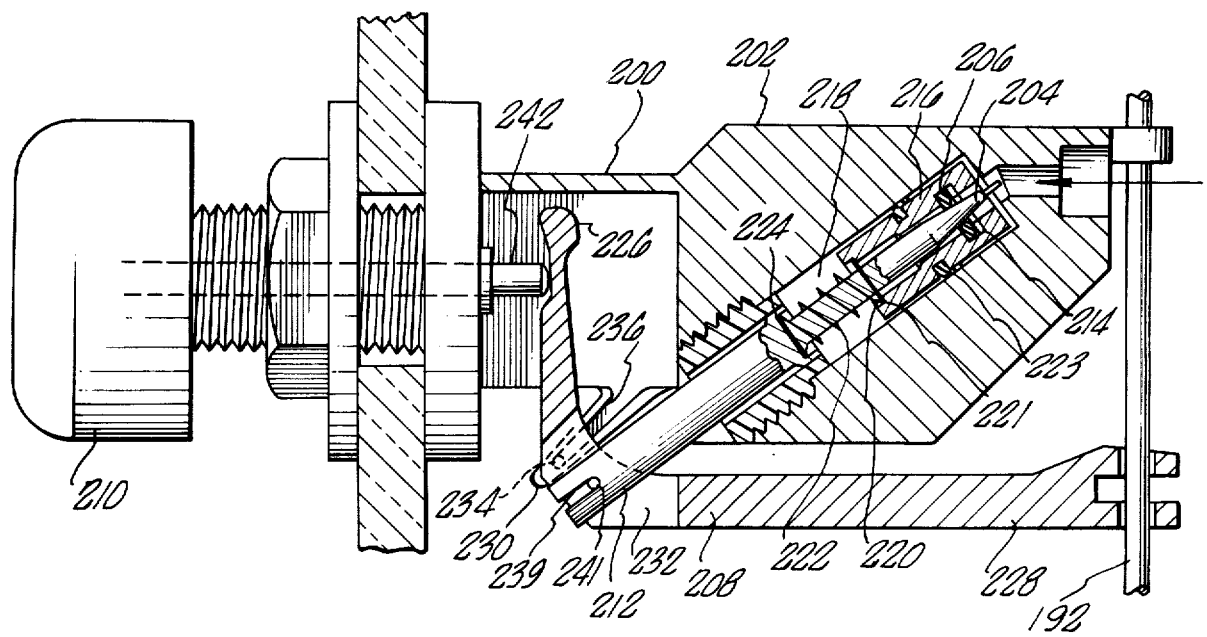

FIG. 5 is a sectional view of the control valve assembly taken along lines 5—5 of FIG. 4. Referring now in detail to the drawings, FIGS. 1-3 illustrate a fluid control system employing one embodiment of the present invention. The control system shown therein is a flush mechanism 10 for toilets 12 of the water tank type. The flush mechanism is essentially comprised of a push button control valve 14, direction flow valve mechanism 16 and lifting assembly 18. The control valve 14 which is of the needle valve type is best seen in FIG. 2 and includes a support frame 19, needle valve 20, floating valve seat 22, scissor arms 24 and 26 and actuating button 27. The needle valve 20 is pivotally secured at its rearward end to scissor arms 24 and 26 by pin 28. Scissor arm 24 is pivotally secured at its other end to the upper portion of the valve frame by pin 30 and scissor arm 26 is pivotally secured to the valve controller lever 32 by means of pin 34. The valve controller lever is in turn pivotally secured to the valve support frame 19 by pin 36 and is rotatable about pin 36 to actuate the needle valve 20, as will be described.

The control valve 14 is mounted on a wall 38 of the toilet tank or cistern 40 by means of a threaded extension 42 which is shown to be integrally formed with the base portion 44 of frame 19. The threaded extension is inserted through an aperture 46 in the wall 38 of the toilet tank and a threaded fastening means 48 is tightened about the protruding portion of extension 42, as seen in FIG. 2 to secure the control valve to the wall portion of the toilet tank. An actuating rod 50 is slidably mounted within and extends through the base portion of the frame and extension 42. The rearward end 52 of rod 50 has threads 54 thereon for securing the rod to the actuating button 27. The forward end 56 of the actuating rod 50 abuts a camming surface 58 of control lever 32 and has a stop means 60 mounted thereon to prevent the rod from being pulled through the base portion of the valve frame. When the actuating button 27 is pressed, the actuating rod 50 moves forward along the camming surface 58 of the control lever 32, causing the lever to pivot clockwise about pin 36. This movement of the lever causes the scissor arms 24 and 26 to retract the needle valve 20 from the valve seat 22, thereby actuating or openig the control valve 14. A recessed area 62 is provided in the forward side of the actuating button 27 to accommodate the rearward portion of the threaded extension 42 when the button is depressed to open the control valve.

Valve seat 22 is mounted on a support stem 64 and is comprised of an annular ring constructed of a standard rubber compound or other suitable material. The seat 22 is affixed to the rearward portion of the support stem so as to be in axial alignment with the needle valve 20 so that upon the needle valve being disposed in the forward position, as seen in FIG. 2, the valve seat is in sealing engagement therewith. The support stem 64 is slidably mounted within an elongated channel 66, centrally disposed within the valve stem housing 68. The rearward portion of the valve stem is of a reduced diameter to provide an annular chamber 70 thereabout. A coil spring 72 is disposed within the annular chamber. An annular diaphragm 74 is held by its outer perimeter portion within the valve stem housing 68 by means of a threadably mounted plug 76 and extends between the valve stem housing and the valve seat support stem and is secured to the valve stem about the inner perimeter portion thereof. Diaphragm 74 together with the coil spring 72 controls the movement of the valve seat support stem and valve seat within the elongated channel, as will be described. A threadably mounted valve stem insert 78 is utilized to secure the valve seat to the valve support stem 64.

The control valve 14 communicates with a standard water inlet 82 through conduit 84 and a direction flow valve mechanism 16. The valve mechanism 16 is mounted in the floor 86 of the toilet tank and is secured in sealing engagement therewith by a threaded fastening member 88 and an annular compressible seal 90. A chamber 92 is provided in the lower end of the direction flow or diverter mechanism and is held in communication with the water inlet by means of threaded fitting 94 and an annular compressible seal 96. The direction control flow valve 16 also has an upper chamber 98 which is in fluid communication with the lower chamber 92 through opening 100. A valve piston 102 is slidably mounted within the upper chamber and is provided with L-shaped upper and lower lip seals 104 and 105 to maintain a fluid tight relationship between the piston and the walls of the upper chamber as the piston moves therein. The piston has vertical extensions 115 and 117 extending from the upper and lower surfaces thereof 116 and 118 respectively. A central channel 106 is disposed within the piston passing through extensions 115 and 117 to communicate the lower chamber 92 with the upper portion 108 of chamber 98. A plurality of pressure relief slots 99 are disposed in a cylindrical stop 101 which abuts the piston in its raised position, to allow fluid flow therethrough. An orifice pin 109 extends through channel 106 to assure uniform flow therethrough and prevent clogging by foreign matter. It can be seen that the water under line pressure from the water inlet 82 passes to the control valve by way of the lower chamber 92, channel 106 in the piston and into conduit 84 through a central bore 110 in the diverter mechanism plug 112. Conduit 84 is secured to the plug by a threaded fitting 114.

The upper surfce 116 of piston 102 is of a greater area than the lower surface 118, so that when control valve 14 is closed, the pressure exerted on the upper suface 116 of the piston is greater than that exerted by the incoming water on the lower surface 118 of the piston, causing the piston to be in the lower position, as seen in FIG. 2. The lower surface of the piston is provided with a flat snap on sealing member 120 which prevents any fluid leakage about the lower side of the piston when the piston is in the lowered position. A water outlet 122 is provided in the side wall of the diverter mechanism which communicates a conduit 124 with the lower portion of the upper chamber 98. When the piston 102 is held in the lower position due to the pressure differential created by the reduced area of the lower surface of the piston, the incoming water is prevented from entering conduit 124 through the outlet 122 and can only flow through the piston and conduit 84 into the forward end 126 of the elongated channel 66 in the valve stem housing of control valve 14. The pressure created by this incoming water urges the valve stem and valve seat carried thereby against the tapered end of the needle valve 20, thereby holding the control valve in a closed position while causing a slight deformation of the diaphragm 74 and compression of coil spring 72.

To actuate the flushing mechanism, button 27 is depressed, causing clockwise rotation of the controlling lever 32 and withdrawal of the needle valve 20 of the valve seat 22. The withdrawal of the needle valve breaks the seal with valve seat 22 and allows water under line pressure to flow pass the open valve and spill into the tank through aperture 126, located downstream of the valve seat 22. The opening of the control valve relieves the pressure which was heretofore urging the valve seat against the needle valve and the valve seat and support stem immediately snap forward within the elongated chamber under the force of the diaphragm 74 and coil spring 72. The dual action of the needle valve and valve seat provides an extremely responsive control valve. With the opening of the control valve, the piston 102 within the upper chamber 98 of the diverter mechanism 16 is rapidly driven to the raised or open position by the pressure of the incoming water in the lower surface thereof and the relief of the pressure on the piston's upper surface. The water then passes through opening 122 in the side wall of the upper chamber and into conduit 124, which communicates with the lifting assembly 18, shown in detail in FIG. 3.

The lifting assembly 18 is comprised of an upper lift cylinder 130 and lower static cylinder 132. A fitting 134 is disposed about the lower end of lift cylinder 130 and forms an aperture 136 in the lower portion thereof. Conduit 124 communicates with the lower portion of the lift cylinder through aperture 126 and is secured thereto by threaded fastening means 138. A lifting piston 140 is disposed within the lift cylinder 130. Piston rod 142 extends downwardly from the piston through an aperture 144 in the lower portion of fitting 136 and is secured by fastening means 146 to the upper portion of the lower static cylinder 132. A diametrical clearance of about 0.001-0.005 inches is provided between the piston rod 142 and the walls defining aperture 144 and the clearance between piston 140 and the wall of the lifting cylinder is about 0.015-0.025 inches. A damping means 147 is disposed above the cylinder fastening means 146 to prevent contact between the lifting cylinder and lower static cylinder and thereby providing for quieter operation. A second piston 148 is provided in the lower static cylinder 132 which is carried by piston rod 150. Piston rod 150 extends through the bottom of the static cylinder 132 and carries the toilet tank ball 152. The bottom of the lower static cylinder is secured to a fitting 156 which forms the bottom wall of the static cylinder. The lower portion of fitting 156 defines an annular flange 158 which carries a check valve 160. The check valve has an aperture 162 therein through which piston rod 150 passes. A diametrical clearance is provided of about 0.005-0.015 inches between the piston rod 150 and the walls defining the aperture in check valve 160 and the clearance between piston 148 and the wall of the static cylinder is about 0.008-0.012 inches. Stops 164 are provided to retain the check valve in place during the operation of the flushing mechanism, although these stops do allow the check valve to float about 1/16 of an inch within the bottom of the static cylinder. The lift cylinder 130 is provided with an upper fitting 166 which defines the upper surface of the lift cylinder and carries the anti-siphon line 168 which communicates with a standard overflow tube 170, supported by bracket 172. Fitting 166 also provides an outlet for the tank fill line 174, which is secured to the fitting by threaded fastening member 176 and through which the toilet tank is refilled after flushing. The fitting 166 is provided with openings 165 which communicate with a sloted extension 175 extending into line 174 to create a siphon brake.

In operation, when the control valve 14 is opened by depressing actuating button 27 which withdraws the needle vave 20 from the valve seat 22, the upstream pressure against the slidably mounted valve seat 64 is reduced and the support and valve seat 22 carried thereby snaps forward under the force of the diaphragm 74 and helical spring 72, thereby providing a sure and rapid opening of the control valve to actuate the flushing mechanism. The pressure against the upper surface 116 of 102 in the diverter mechanism 16 immediately drops to 0 and the piston is forced rapidly against the upper surface of chamber 98, thereby allowing almost instantaneous water flow through conduit 124 to the lifting mechanism 18. The water enters the lifting cylinder 130 under line pressure and immediately raises piston 140 to the elevated position which is illustrated by phantom lines in FIG. 3. As the piston moves upwardly, it correspondingly lifts the lower static cylinder 132. As shown in FIG. 1, the lower static cylinder is disposed below the water level 178 in the toilet tank and as the static cylinder has an upper opening 180 therein and a diametric clearance between the check valve 160 and piston rod 150 in the lower end thereof, it is filled with water. When the static cylinder is quickly raised, the piston 148, and consequently the tank ball 152, is pulled upwardly therewith due to the presence of the static water beneath the piston 148, thereby allowing the water within the tank to flush down the cistern drain. It should be noted, however, that the lifting mechanism will operate if the lower static cylinder is only about one third submerged below the water level in the tank. This hydraulic flushing operation operates very smoothly and rapidly, only about one quarter of a second transpiring between the initial pressing of the actuating button and the lifting of the tank ball from the cistern drain.

Following the flushing of the toilet tank 40, the tank is refilled through the tank fill line 174. This begins to occur as soon as the piston 140 reaches the elevated position within the lifting cylinder 130, whereupon the water entering the lifting cylinder through conduit 124 communicates with fill line 174 through an opening 184 in fitting 166. Due to the clearance between the check valve 160 and piston rod 150 within the lower static cylinder, the water held within that cylinder begins to flow therethrough as soon as the water level within the toilet tank falls below the piston 148. As the water drains from the lower static cylinder, the tank ball slowly and accurately returns to the cistern drain 182 to form the desired seal therewith. Concurrently with the descent of piston 150 within the static cylinder, the piston 140 begins to descend within the lifting cylinder as the water therein passes from the lower end of the cylinder through the diametrical clearance about the piston rod 142. As the piston 140 descends, the lower static cylinder is returned to its nonoperative position, illustrated in FIG. 3, and check valve 160 floats upwards about 1/16 inch and the cylinder is again filled with water and readied for reactivation. This upward movement of the check valve is limited by a locking ring 163. The time delay necessary before the flush mechanism can be again operative depends solely on the line pressure which determines the rate at which the water tank is filled.

As the water within the toilet tank continues to rise, float 190, which is pivotally secured to the control lever 32 of control valve 14 by means of a rod 192, support block 193 and yoke 194, causes the controlling lever to move in a counterclockwise direction. This counterclockwise rotation of the controlling lever causes the needle valve 20 to move forwardly towards the valve seat 22. As the tapered end of the needle valve approaches the valve seat and restricts the area between the seat and needle valve, an upstream pressure build up occurs which overcomes the force exerted by the diaphragm 74 and coil spring 72 and forces the slidably mounted support to move rearward, urging the valve seat 22 against the tapered end of the needle valve 20, closing control valve 14. As soon as the control valve is closed, pressure builds up in the upper portion of chamber 98 within the diverter mechanism 16, causing the piston 102 therein to move downwardly and seal off conduit 124, thereby preventing further flow to the upper lifting cylinder 130.

In addition to providing a rapid and quiet flushing of the water tank, the toilet flush mechanism 10 also provides a water recovery mechanism, should a leak develop. As the water level drops within the tank, the float 190 would be correspondingly lowered, causing a slight clockwise rotation of the controlling lever 32. This would act to momentarily withdraw the needle valve 20 from a sealing engagement with the valve seat 22 and allow water to pass therethrough and into the tank via outlet 126. This opening of the control valve 14, however, would be insufficient to cause a lifting of the piston 102 within the diverter mechanism and a flushing of the water within the tank, as the opening of the control valve 14 would be very slight and not create the necessary pressure drop which results when the actuating button 27 is depressed.

Additional features of the fluid control system include an adjustable clip member 196 which is provided to vertically position the float 190 along rod 192 and thereby maintain a desired water level within the toilet tank. Finally, an indicator 198 can be provided on the upper portion of the control valve housing 19 to adjust the positioning of the controlling lever 32 to the line pressure prior to use. This is accomplished by rotating the valve seat housing 68 with respect to the frame which, due to the threaded engagement between the frame and valve seat housing would linearly displace the valve seat 22 and, correspondingly, needle valve 20, which in turn would cause a slight rotation of the controlling lever 32. When an indicator 199 on the upper extremity of the controlling lever is disposed beneath the indicating means 198, the controlling lever 32 has a vertical arcuate stroke of about ⅜ inch which has been found to be ideal for operation of the control valve 14 and allows the valve to function at all variable line pressures including those as low as about 1 psi. It should be noted, however, that such an adjustment is generally not necessary to the operation of the valve but could be utilized in accordance with line pressures of varying psi to optimize the functioning of the valve.

A second embodiment of the present invention is illustrated in FIGS. 4 and 5 of the drawings. The control valve assembly 200 shown therein which is currently the preferred embodiment of the assembly operates in a similar manner to control valve assembly 14 and includes a housing 202, needle valve 204, floating valve seat 206, pivot arm 208 and actuating button 210. The needle valve 204 has a base position integrally formed therewith defining a lower sleeve 212. The valve seat 206 which is formed by an "O" ring constructed of neoprene or a soft rubber compound is carried by a piston or valve stem 216 which is slidably mounted in the rearward end of an elongated chamber 218 in the valve housing 202. A back-up flat ring 214 is carried by the valve stem upstream of the "O" ring to improve the sealing effect of the "O" ring should any skrinkage occur in the "O" ring. The valve stem 216 also includes a recessed area 220 in the rearward end thereof to receive the extended end of a coil spring 222 which abuts stops 221 defined by the stem. An "L" shaped stem seal 223 is also provided about the stem to prevent leakage thereby. The needle valve extends through the coil spring 222 and into the valve seat as seen in FIG. 5. An annular stop 224 defined by the base portion of the needle valve 204 abuts the rearward end of the coil spring to secure the coil spring in place about the needle valve in chamber 218.

The pivot arm 208 is of an "L"-shaped configuration defining a short upright activating arm portion 226 and a horizontal lifting arm portion 228. The pivot arm is bifurcated at the juncture 230 between the two arm portions defining a slot 232 therein. A pin 234 extends through the pivot arm 208 and the slot 232 therein. One end of the protruding pin is received in an angularly disposed slot 236 formed to one side of the underside of the valve housing. The other end of the pin is disposed in an aperture which is also formed in the underside of the valve housing on the opposite side thereof from slot 236. The configuration allows the pivot arm to be easily pivotally mounted on the underside of the valve housing as illustrated in FIG. 5.

The pivot arm 208 is in turn secured to the needle valve 204 by means of a pair of open ended slots 239 in the sleeve 212 defined by the base portion of the needle valve, which slots receive the inwardly extending ends of a pair of pins 241 which are carried by the pivot arm 208 and extend into slot 232 below pin 234, as best seen in FIG. 5. With this construction, the needle valve is held in place by pins 234 and 241 and rotational movement of the pivot arm 208 about pin 234 causes the needle valve to undergo linear movement within the chamber 214 in the valve housing. An actuating rod 242 which is secured to the actuating button 210 is slidably mounted in the valve housing in substantially the same manner as actuating rod 50 is mounted in frame 19 of the control valve 14 of the prior embodiment.

The operation of control valve assembly 200 is substantially the same as that of valve 14. Depression of the actuating button causes rod 242 to abut against the upright activating arm portion 226 of pivot arm 208 causing pivot arm 208 to rotate clockwise about pin 234. Such rotational movement of the pivot arm causes the needle valve 204 to withdraw from the valve 206. The upstream pressure against the slidably mounted valve seat is reduced and the valve stem and seat snaps forward under the force of the helical spring 222, thereby providing a shear and rapid opening of the control valve to actuate the flushing mechanism.

Following the flushing of the toilet tank 40, the tank is refilled as earlier described. As with the control valve 14 of the prior embodiment, a rod 192 is secured to a float which in turn is secured to the horizontal lifting arm portion 228 of the pivot arm such that upward movement of the float caused by a rise of the water level within the toilet will cause the pivot arm to move in a counterclockwise rotation moving the needle valve toward the valve seat. As the tapered end of the needle valve approaches the valve seat and restricts the area between the seat and needle valve, an upstream pressure build-up occurs which overcomes the force exerted by the coil spring 222 and forces the slidably mounted valve stem and seat to move rearward, urging the valve seat against the tapered end of the needle valve closing the control valve.

While the control valve assembly 200 operates in a manner similar to that of control valve asembly 14 of the prior embodiment, its particular construction reduces the cost of manufacture, obviates any need for a separate diaphragm and provides rapid and precise control of the fluid system.

Various other changes and modifications may be made in carrying out the present invention without departing from the spirit and scope thereof. Insofar as these changes and modifications are within the purview of the appended claims, they are to be considered as part of the present invention.

I claim :

1. A valve assembly for selectively controlling fluid flow therethrough to rapidly create and discharge a pressure drop thereacross, said assembly comprising a valve support structure, a needle valve member carried by said valve support structure and having a tapered end portion, a chamber disposed in said valve support structure for the passage of fluid therethrough, valve inlet means disposed in said structure for communicating said chamber with a fluid supply, a valve stem slidably mounted within said chamber, an annular valve seat carried by said stem in axial alignment with said needle valve member for selective sealing engagement with the tapered end portion thereof, means for moving said needle valve member from said annular valve seat, means for moving said valve seat from said needle valve member upon said needle valve being moved from said valve seat, and means for moving said needle valve member toward said valve seat to reduce the flow of fluid through said chamber and cause said valve seat to be forced by said fluid flow into sealing engagement with said tapered end of said needle valve member.

2. The combination of claim 1 wherein said means for moving said valve seat from said needle valve member comprises a spring means disposed within said chamber extending between said needle valve member and said valve seat.

3. The combination of claim 1 wherein said means for moving said needle valve comprises a cntrol lever pivotally mounted on said valve housing and having a camming surface thereon, said needle valve being pivotally carried by said control lever such that rotation of said control lever causes said needle valve to undergo linear movement with respect to said valve seat and a follower rod adapted to abut said camming surface and impart rotational movement to said control lever.

4. The combination of claim 2 including a diaphragm carried by said valve support structure for biasing said valve stem and said valve seat from said needle valve member.

5. The combination of claim 3 including a float member carried by said control lever for imparting rotational movement to said control lever causing said needle valve to move toward said valve seat upon said float being elevated with respect to said valve housing.

6. A valve assembly for controlling a pressurized fluid flow therethrough to rapidly create and discharge a pressure drop thereacross, said assembly comprising a valve support structure, said structure defining an elongated chamber therein for the passage of fluid therethrough, a control lever pivotally mounted on said structure, a needle valve member having a tapered end portion, said member being pivotally carried by said control lever such that rotation of said control lever causes said needle valve member to undergo linear movement along the longitudinal axis of said chamber, a valve stem slidably mounted within said chamber, an annual valve seat carried by said stem in axial alignment with said needle valve member for selected sealing engagement with the tapered end of said needle valve member, a valve inlet means disposed in said structure communicating one end of said chamber with a fluid supply, means for rotating said control lever in one direction causing said needle valve to move from said valve seat and allowing fluid to pass through said valve seat, biasing means disposed in said chamber for moving said valve seat from said needle valve member upon said needle valve being moved from said valve seat, and means for rotating said control lever in a second direction causing said valve seat to move toward said tapered end of said needle control valve to reduce the flow of fluid through said chamber and cause said valve seat to be forced by said fluid flow into sealing engagement with said tapered end of said needle valve member.

7. The combination of claim 5 wherein said valve stem has a channel therein for the passage of fluid therethrough and said annular valve seat is disposed adjacent one end of said stem and about said channel.

8. The combination of claim 5 wherien said control lever defines a camming surface thereon and incuding a follower rod carried by said valve support structure and adapted to abut said camming surface and impart rotational movement to said control lever in said one direction.

9. The combination of claim 7 including a float member carried by said control lever for imparting rotational movement to said control lever in said second direction.

* * * * *